Dec. 5, 1944.   G. W. MATTSON   2,364,156
GEARING
Filed July 5, 1943   2 Sheets-Sheet 1
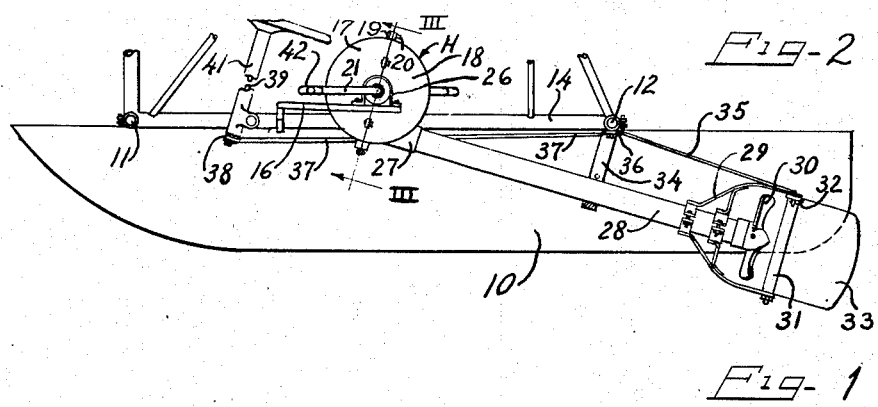
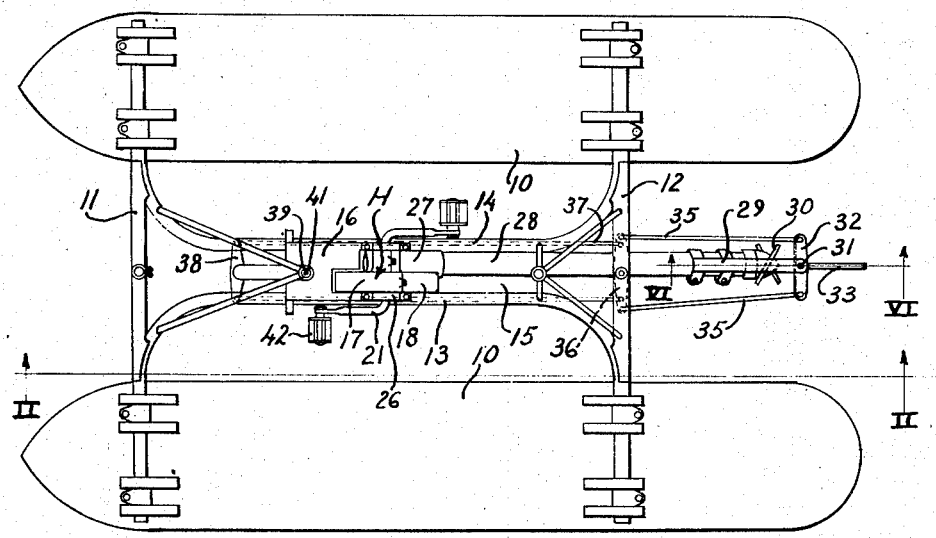
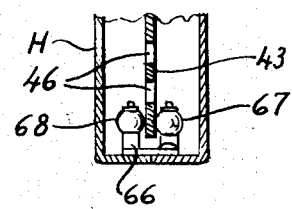
Inventor
GUST W. MATTSON
by

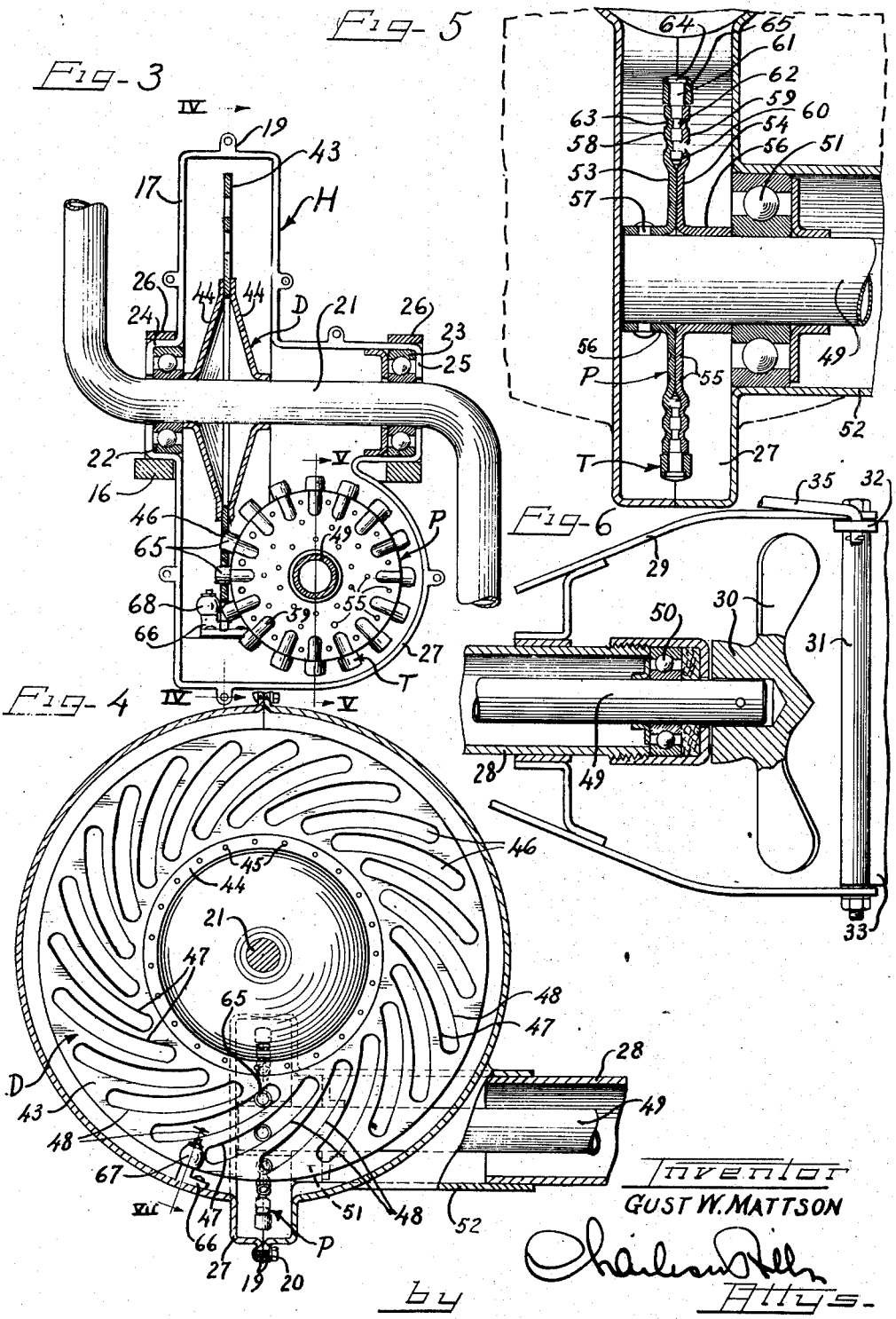

Patented Dec. 5, 1944

2,364,156

UNITED STATES PATENT OFFICE 2,364,156

GEARING

Gust W. Mattson, Chicago, Ill.

Application July 5, 1943, Serial No. 493,518

7 Claims. (Cl. 74—412)

My invention relates to self-propelled water vehicles, more particularly of the pontoon type, and covers improvements over the self-propelled water vehicle disclosed in my Patent No. 2,177,074, dated October 24, 1939.

In vehicles of the type referred to, the drive shaft extends transversely of the vehicle while a propeller shaft extends longitudinally of the vehicle at right angles with the drive shaft, and in the structure of my patent referred to, the drive shaft supports a helical gear which meshes with a helical pinion on the propeller shaft. It has been found that with such gear drive there is considerable friction and also breakage of teeth.

An important object of my present invention is to provide an improved driving connection between the drive shaft and the propeller shaft which will materially reduce the friction and breakage and which furthermore can be more economically produced.

More in detail, an important object of the invention is to provide a driving gear in the form of a disk having a circular row of substantially involute slots or passages therethrough providing substantially involute driving surfaces for engagement with radial teeth on a driven member on the propeller shaft, with the driven member rotated in a plane at right angles to the plane of the driving member on the driving shaft.

A further object is to construct the driving member of simple sheet metal stampings, and to construct the body of the driven member of simple sheet-metal stampings between which are secured the radially extending teeth which are engaged by the driving surfaces on the driving member.

Another important object is to provide simple means for guiding the driving member for accurate driving engagement with the driven member.

The above enumerated and other features of my invention are embodied in the structure shown on the drawings, in which:

Figure 1 is a plan view of the vehicle;

Figure 2 is a section on plane II—II of Figure 1;

Figure 3 is an enlarged section on plane III—III of Figure 2;

Figure 4 is a section on plane IV—IV of Figure 3;

Figure 5 is an enlarged section on plane V—V of Figure 3;

Figure 6 is an enlarged section on plane VI—VI of Figure 1; and

Figure 7 is an enlarged section on plane VII—VII of Figure 4.

Referring to Figures 1 and 2, pontoons 10 are secured to framework which comprises the transversely extending front and rear parts 11 and 12 and the longitudinally extending U-shaped parts 13 and 14 between the transverse parts, the yokes of the U-frame parts being separated by the space 15. Secured to the yoke parts 13 and 14 is a bifurcated supporting plate 16 through whose bifurcated end and the space 15 projects the housing structure H for the driving mechanism. The housing H comprises the semi-cylindrical sections 17 and 18 provided with ears 19 to be secured together by bolts 20. Extending axially through the housing H is the driving or crank shaft 21 journaled in ball bearings 22 and 23 which are housed within the cylindrical extensions 24 and 25 formed by outwardly deflecting the side walls of the housing 17 and 18. These cylindrical deflected housing portions rest on the plate 16 and are engaged by straps 26 secured to the plate so that the housing structure is thus rigidly mounted on the plate.

The housing has the enlargement 27 at one side from which extends the tube 28 which at its rear end has secured thereto the framework 29 in which the propeller 30 is located, and the rear end of this framework journals a shaft 31 carrying at its upper end a cross-bar 32, the rudder 33 extending from the shaft. A supporting hangar 34 for the tube 28 depends from the frame part 12. The ends of the cross-bar 32 are connected by rods or cables 35 with the ends of a bar 36 fulcrumed on the frame part 12, and from this bar rods or cables 37 extend to the cross-bar 38 at the lower end of the steering shaft 39 for the steering wheel 40, the steering shaft being supported in the steering column 41.

The crank shaft 21 has the pedals 42 thereon and a suitable seat (not shown) is provided for the operator for operating the crank shaft. Within the housing H and mounted on the crank shaft is the driving element D shown as comprising the annular disk 43 secured to and supported by conical-shaped hub members 44 which may be secured to the disk as by spot welding 45, the disk and the hub members being simple sheet-metal stampings. The hub members may be secured as by welding to the crank shaft or by other suitable means.

The disk has the substantially involute slots 46 therethrough equally spaced from each other in a circular row between the inner and outer peripheral edges of the disk, each slot presenting opposed parallel camming or driving surfaces 47 and 48.

Extending through the propeller tube 28 and into the enlargement 27 of the housing H is the propeller shaft 49 which, as shown, may be tubular, this shaft at its outer end having the propeller 30 mounted thereon and being journaled in a ball bearing 50 at the outer end of the tube 28. The propeller shaft at its inner end is journaled in a ball bearing 51 disposed at the inner end of the cylindrical extension 52 on the enlargement 27 from which the tube 28 extends. Inwardly of the bearing 51 the shaft 49 mounts the driven element P which operates within the housing enlargement 27. As shown on Figures 3 and 4 the axis of the driven element P is at right angles with the axis of the crank shaft 21, and the driven element is adjacent to one side of the disk 43 of the driving element D and is rotatable in a plane extending axially and diametrically through the disk 43, the driven member being provided with teeth T for engagement in the slot 46 in the driving member disk. Referring to Figure 5, the driven member is shown as comprising two segmental disks 53 and 54 rigidly secured together as by spot welding 55 and having hub portions 56 receiving the propeller shaft 49, means such as a pin 57 securing the driven structure to the propeller shaft. At regularly spaced apart points, the disks 53 and 54 have the opposed outward deflections 58 and 59 providing sockets 60 for teeth or pins 61. To hold the pins against radial displacement, they may be provided with circumferential channels 62 for receiving indentures 63 formed in the disks, the pins being assembled in the sockets before the disks are spot welded together. The pins terminate in heads 64 between which and the periphery of the disks 53 and 54 the pins journal the rollers 65, the diameter of these rollers being substantially the width of the slots 46 in the disk 43 of the driving member.

Referring to Figures 3 and 4, the cooperation of the rollers 65 with the driving slots 46 is clearly shown. As the crank shaft 21 is operated for rotation of the driving element D in the direction of the arrow indicated on Figure 4, the camming or driving edges 47 of the slots 46 engage successively with the tooth rollers 65 for rotation of the driven element P in the direction of the arrow indicated on Figure 3, the propeller being then operated for forward travel of the vehicle, the driving element having always driving engagement with more than one tooth of the driven element. When the direction of operation of the crank shaft is reversed, the driving or camming edges 48 of the slots 46 will engage with the teeth rollers for rotation of the driven element P and the propeller in reverse direction for backward movement of the vehicle.

As the teeth or pins on the driven member P during the forepart and latter part of their engagement in the slots 46 are at more or less of an angle with the plane of the driving disk, this disk may be subjected to lateral thrust, and to take up such thrust and to maintain the driving disk in its proper driving plane, abutments are provided therefor at opposite sides thereof. As shown on Figures 4 and 7, a U-shaped bracket 66 is secured in the housing H close to the driven element P with its legs extending to opposite sides of the driver disk 43 and mounting rollers 67 and 68 engaging the opposite sides of the disk so as to take up any lateral thrust of the disk while the vehicle is being propelled.

With the engagement of the rollers on the teeth of the driven element P by the comparatively low incline edges of the slots 46 of the driving element, the driving friction will be greatly reduced and the vehicle can be propelled with much less effort. With the driving and driven elements constructed of sheet metal parts which can be readily stamped out of stock material, the cost of production is greatly reduced.

I have shown a practical and efficient embodiment of my invention, but I do not desire to be limited to the exact construction and arrangement shown and described as changes and modifications may be made without departing from the scope of the invention.

I claim as follows:

1. In gearing, a rotatable member having involute slots therein arranged in spaced relation in a circular row concentric with the axis of said member, and each slot providing opposed parallel involute surfaces, and an element rotatable in a plane at right angles to the plane of rotation of the said member and having teeth thereon engageable in said involute slots for establishing a drive connection with said involute surfaces.

2. In gearing, a rotatable member having involute slots therein arranged in spaced relation in a circular row concentric with the axis of said member, and each slot providing opposed parallel involute surfaces, and an element rotatable in a plane at right angles to the plane of rotation of the said member and having teeth thereon engageable in said involute slots for establishing a drive connection with said involute surfaces, said slots and teeth being so arranged that at least two of said teeth are at all times in register with said slots.

3. In a gearing, a rotatable member having curved slots therein arranged in predetermined spaced relationship in a circular row concentric with the axis of said member, and an element rotatable in a plane at substantially right angles to the plane of rotation of said member and having projections thereon engageable in said curved slots for establishing a drive connection with the edges of said slots, each of said slots having a predetermined angular relation to the axis of said member which is substantially the same for all the slots.

4. In a gearing, a rotatable member having an annular area thereof concentric to the axis of said member provided with transversely extending non-radial slots, said slots being defined by edges comprising drive surfaces, and an element rotatable in a plane at a substantial angle to the plane of rotation of said member and having radial projections thereon engageable in said slots for establishing a drive connection with the slot edges, the drive connection and the direction of movement between each of said slot edges and said projection being the same in the case of all the slots and projections.

5. In a gearing, a rotatable member having an annular area thereof concentric to the axis of said member provided with transversely extending non-radial slots, said slots being defined by edges comprising drive surfaces, and an element rotatable in a plane at a substantial angle to the plane of rotation of said member and having radial projections thereon engageable in said slots for establishing a drive connection with the slot edges, said slots and projections being so arranged that at least two of said projections are at all times in register with said slots.

6. In a gearing for use in driving the propeller of a water vehicle or the like, a rotatable driving member having an annular area thereof concentric with the axis of said member provided with transversely extending non-radial slots, said slots being defined by edges comprising drive surfaces, and a driven element rotatable in a plane at a substantial angle to the plane of rotation of said member and having radial projections thereon engageable in said slots for establishing a drive connection with the slot edges, said projections each comprising a roller movable in a curved path into and out of a cooperating slot as the roller and slot are brought into register.

7. In a gearing for use in driving the propeller of a water vehicle or the like, a rotatable driving member having an annular area thereof concentric with the axis of said member provided with transversely extending non-radial slots, said slots being defined by edges comprising drive surfaces, and a driven element rotatable in a plane at a substantial angle to the plane of rotation of said member and having radial projections thereon engageable in said slots for establishing a drive connection with the slot edges, said rotatable member having said annular area thereof formed flat with said slots extending through the thickness of the same, and also being provided with means in the form of abutments at opposite sides of said annular area for holding said member in its driving plane and at substantially right angles to the plane of the driven element.

GUST W. MATTSON.